United States Patent [19]
Etheridge et al.

[11] Patent Number: 4,479,610
[45] Date of Patent: Oct. 30, 1984

[54] PIVOT VALVE FOR CROP SPRAYING EQUIPMENT

[76] Inventors: Robert E. Etheridge, P.O. Box 5421, Greenville, Miss. 38701; Philip L. Lewis, Rte. 1, Box 71-A, Glen Allan, Miss. 38744

[21] Appl. No.: 386,261

[22] Filed: Jun. 8, 1982

Related U.S. Application Data

[63] Continuation of Ser. No. 123,185, Feb. 5, 1980, abandoned.

[51] Int. Cl.³ .............................................. B64D 1/18
[52] U.S. Cl. ................................ 239/171; 137/543.15; 239/570; 239/587
[58] Field of Search ................... 239/171, 533.15, 551, 239/562, 570, 571, 569, 580, 587, 166, 176; 251/148; 137/798, 543.17, 543.15

[56] References Cited

U.S. PATENT DOCUMENTS

| | | | |
|---|---|---|---|
| 1,360,960 | 11/1920 | Kudla | 137/543.15 |
| 2,077,040 | 4/1937 | Creveling | 137/543.17 |
| 2,149,660 | 3/1939 | Blood, Jr. | 239/533.15 |
| 2,472,030 | 5/1940 | Thulin | 239/587 |
| 2,478,760 | 8/1949 | Holicer | 137/543.17 |
| 2,580,145 | 12/1951 | White | 239/176 |
| 2,692,799 | 10/1954 | Parrott | 239/166 |
| 3,198,480 | 8/1965 | Morse | 251/148 |
| 3,395,725 | 8/1968 | Roach | 137/543.15 |
| 3,672,649 | 10/1973 | Dalhaus | 239/171 |
| 4,068,833 | 1/1978 | Buford | 239/587 |

Primary Examiner—John J. Love
Assistant Examiner—Michael J. Forman
Attorney, Agent, or Firm—Harvey B. Jacobson

[57] ABSTRACT

A valve for connection to the boom of a crop spraying aircraft for emission of chemicals includes a pressure actuated valve member disposed therein in order to provide positive flow of the chemicals when pumped through the valve and positive dripless turnoff when the pressure is removed from the chemicals. Further, the valve is produced in two pivotally connected sections having a gauge disposed thereon for controlling the spray angle of the emitted chemicals and to thereby adjust the swath covered at each pass.

2 Claims, 9 Drawing Figures

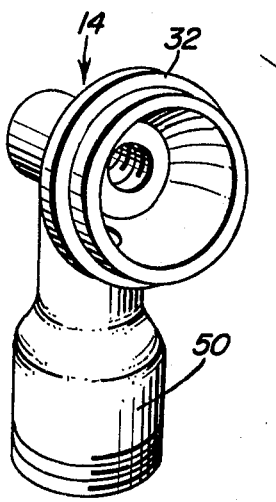
FIG. 4
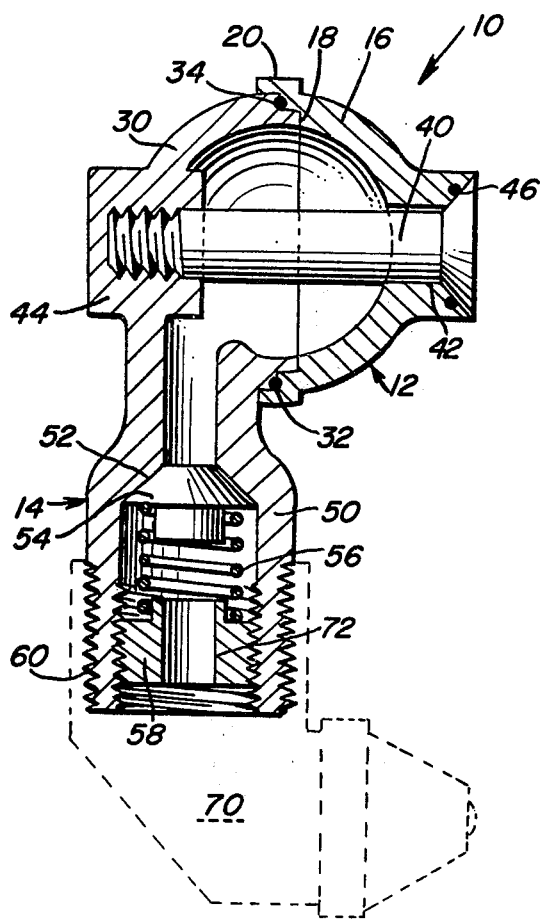
FIG. 6
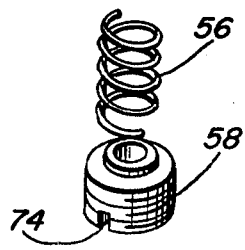
FIG. 5
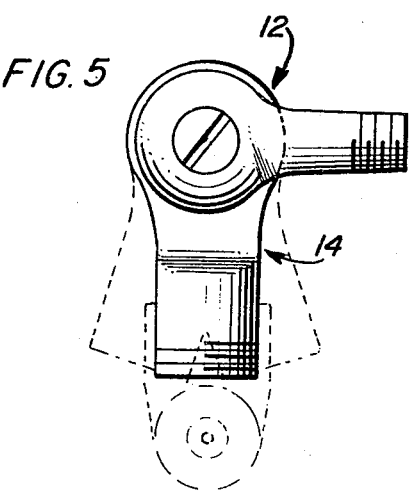
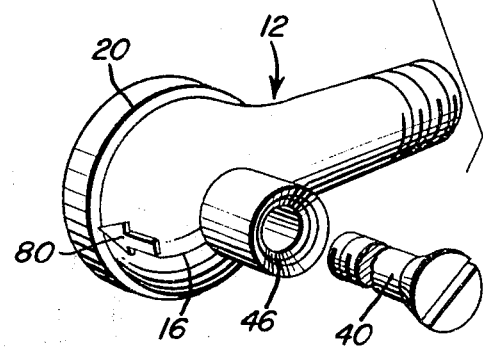

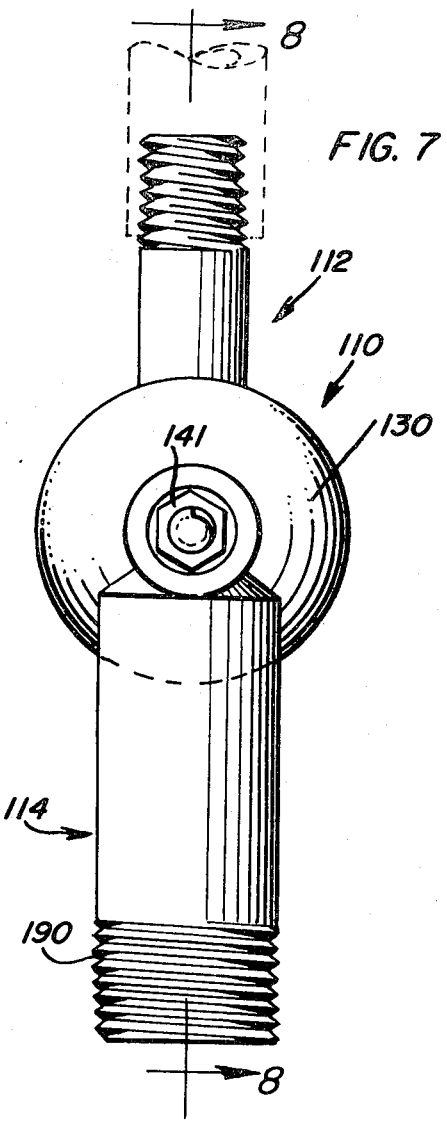
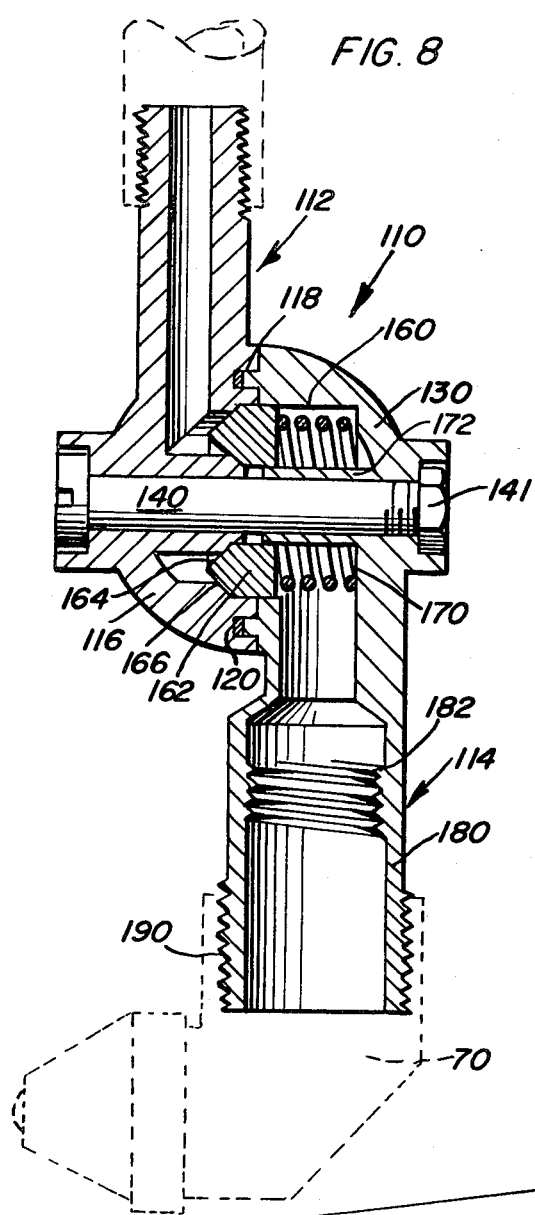
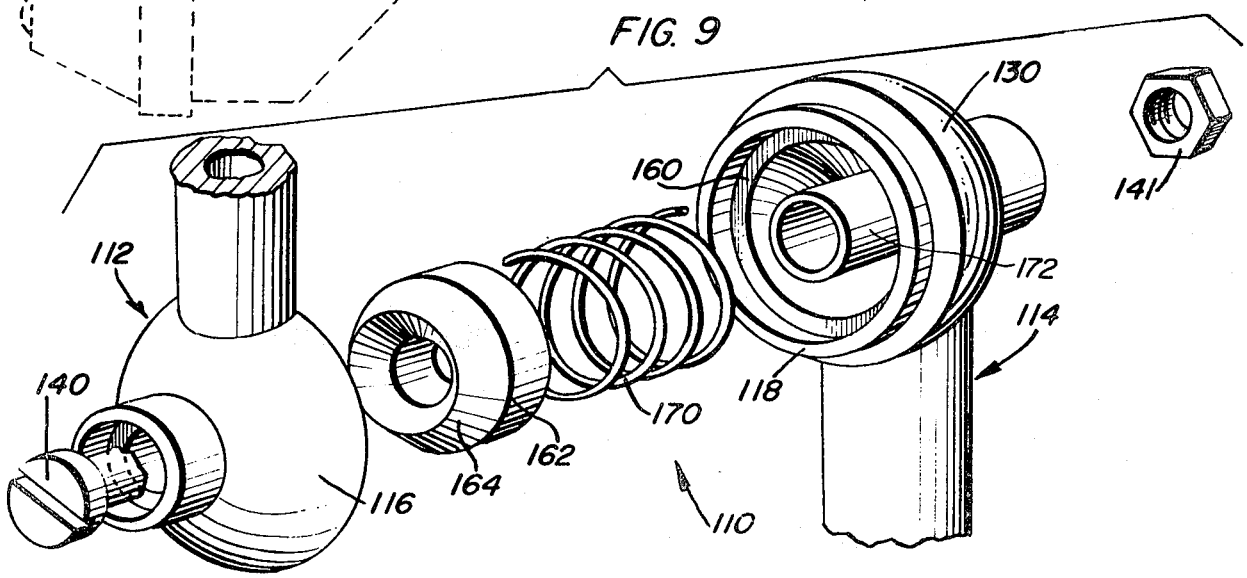

PIVOT VALVE FOR CROP SPRAYING EQUIPMENT

This application is a continuation of application Ser. No. 123,185, filed Feb. 5, 1980 now abandoned.

BACKGROUND OF THE INVENTION

1. Field of the Invention

This invention relates to crop spraying and especially to valves utilized for dispensing chemicals in a crop spraying apparatus.

2. Discussion of Related Art

An aircraft employed in crop spraying generally carries a boom which runs under the wing of the aircraft. Attached to the boom are some sixty to sixty-four valves. The spray tip out of which the chemical is emitted is attached to the other end of each valve. The conventional valve has an apparatus at one end which contains a rubber diaphragm to prevent the dripping of chemicals by enabling the pilot to effect a positive turn-off. The rubber diaphragms are adnormally bulky and therefore increase airflow or drag thus reducing the planned performance. Also, the rubber diaphragms rupture frequently and have to be replaced quite often. The conventional valve also utilizes a spray tip which is affixed directionally so that adjustment of the spray direction or pattern must be effected by movement of the entire boom to the desired adjustment position. Resetting in this manner requires a great deal of guess work as well as consuming a great deal of effort.

A great many nozzle and valve assemblies have been suggested for use in dispensing fluid. For instance, U.S. Pat. No. 2,683,626, issued July 13, 1954 to Wahlin, shows a spray nozzle with a pivoting head for controlling the width of spraying of ground areas such as fields or the like.

U.S. Pat. No. 3,893,630, issued July 8, 1975 to Bochman et al, includes two housings, one of which includes a cylindrical recessed portion and the other of which includes a cylindrical portion adapted to rotatably mate with the recess.

U.S. Pat. No. 4,068,833, issued Jan. 17, 1978 to Buford, shows a cutting or a welding torch with a swivel-type nozzle which incorporates a gauge or face with markings indicating the angularity of the nozzle axis with respect to the main axis of the torch to allow the operator to set the nozzle at a number of conventional angles.

SUMMARY OF THE INVENTION

One object of the present invention is to provide a pivot valve for crop spring equipment which can easily be attached to a crop spring boom to dispense liquid fertilizer or the like in response to an increase in pressure of the material to be dispensed.

A further object of the present invention is to provide a pivot valve for crop spring equipment which provides a positive shutoff upon decrease in pressure of the material to be dispensed in order to reduce dripping of the material.

Another object of the present invention is to provide a pivot valve for crop spring equipment which can be angularly adjusted in order to control the swath sprayed.

A still further object of the present invention is to provide a pivot valve for crop spring equipment which valve is designed so that the surface is almost free of fittings or parts that would interface with the airflow under the wing of a aircraft.

In accordance with the foregoing objects, the present invention includes a two-part housing having mating semi-spherical halves, each half including a tubular extension extending therefrom. The tubular extension from one housing half threadedly engages the distribution boom on a crop spraying aircraft. The other tubular extension includes a valve seat and a spring loaded valve member which is biased against the seat for displacement upon an increase in pressure of material to be sprayed. A threaded insert forces the valve onto the seat and controls the pressure applied thereagainst. The semi-spherical housing portions contain cooperating gauge actions. One housing portion having an arrow thereon while the other housing portion has gradations to indicate the angularity existing between the housing halves.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a front elevational sectional view taken through the center of the valve of FIG. 3.

FIG. 5 is a side elevational view showing the angular adjustment capability of the pivot valve.

FIG. 6 is an exploded view showing the valve components.

FIG. 7 is an elevational view of a second embodiment of the pivot valve.

FIG. 8 is an elevational sectional view taken substantially along a plane passing through section line 8—8 of FIG. 7.

FIG. 9 is an exploded view of the second embodiment of the pivot valve.

DESCRIPTION OF THE PREFERRED EMBODIMENT

Figure 1:
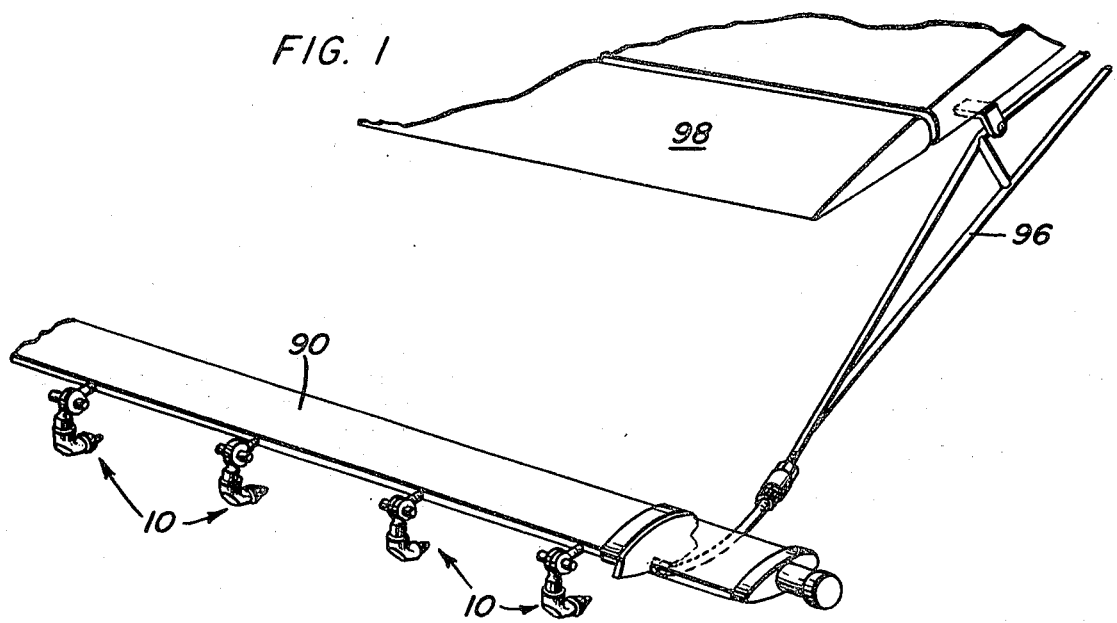
FIG. 1 is a fragmental perspective view of a portion of a crop spraying apparatus incorporating the pivot valve of the present invention.

Now with reference to the drawings, a pivot valve for crop spraying equipment incorporating the principles and concepts of the present invention and generally referred to by the reference numeral 10 will be described in detail. With particular reference to FIGS. 2–6, it will be seen that the pivot valve 10 comprises a housing having two separate housing halves 12 and 14. Housing half 12 has a semi-spherical portion 16. A recess 18 is formed on the inner periphery of the semi-spherical portion 16 and an annular flange 20 is attached to the external periphery. A threaded extension 22 is connected from the semi-spherical section 16 and contains threaded end 24.

The other housing half 14 also has a semi-spherical portion 30 with an annular recess 32 around its external periphery for cooperation with recess 18 and flange 20 on the housing half 12. A seal 34 is disposed between the two semi-spherical halves 16, 30. A screw member 40 extends through a countersunk opening 42 in housing half 12 to engage threaded boss 44 of the opposite housing half 14. In this way, the entire housing is held together in an intergral manner. A seal 46 is placed in the countersunk portion of opening 42 to seal the head of screw 40 against leakage. An extension 50 is connected to the semi-spherical portion 30 and contains the valving elements of the invention. A valve seat 52 is formed in the extension 50 and mates with valve element 54. Valve element 54 is biased upwardly into the seat by coil spring 56. The tension of spring 56 is adjusted through apertured plug 58 which threadedly engages the lower end of extension 50. Additional threads 60 are formed on the outer surface of the lower end of extension 50 and mount a nozzle tip 70 which can be angularly oriented as shown or formed in any other suitable manner. Plug 58 has an aperture 72 formed through the center thereof to allow fluid flow and also contains a screw slot 74 for adjustment purposes as is evident.

In order to adjust the position of nozzle 70, screw 40 is loosened and the housing halves are rotated relative to each other to point nozzle 70 in the desired direction. In order to allow for consistent repeatable adjustment, a gauge comprising arrow head 80 on housing half 12 and suitable gradations 81 on housing half 14 are provided.

Figure 2:
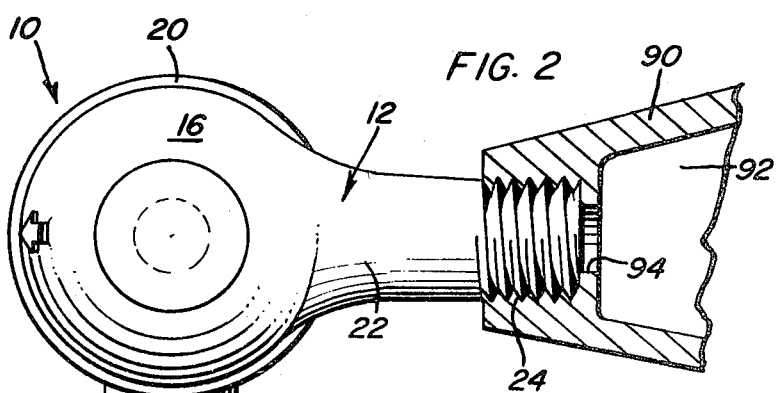
FIG. 2 is a side elevational view of the pivot valve showing the distribution boom in section.
Figure 3:
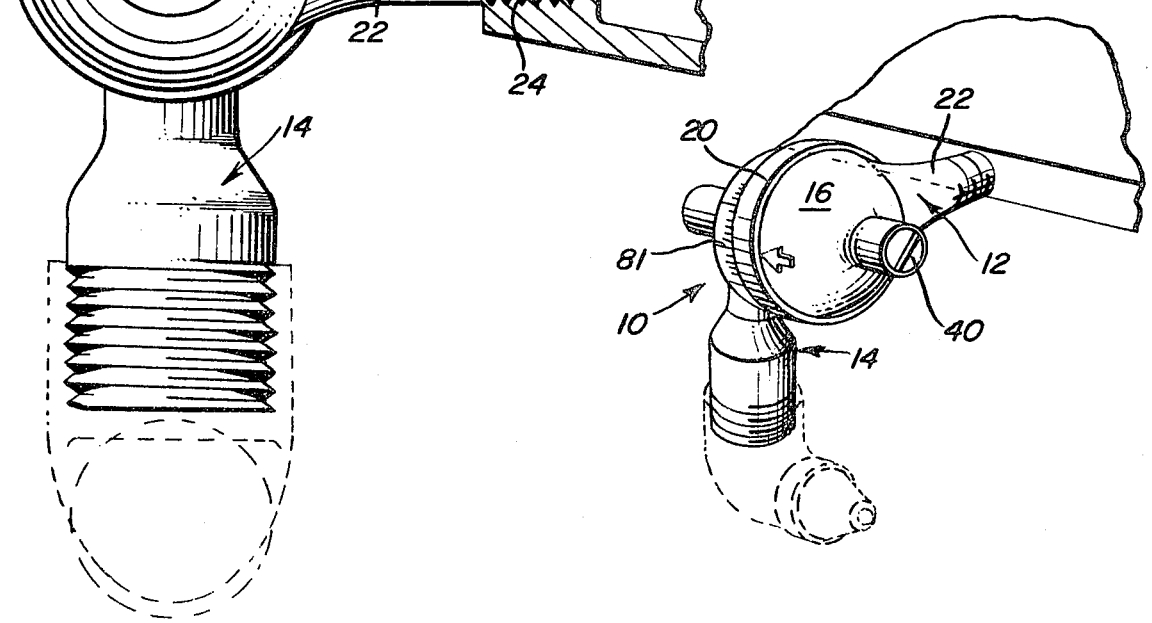
FIG. 3 is a perspective view of one pivot valve extending from a portion of the boom.

From the foregoing it is quite evident that fluid flows through the pivot valve 10 and, when under sufficient pressure, displaces valve element 54 from the valve seat whereupon the fluid flows through aperture 72 and out nozzle 70 onto the crops at which the nozzle is directed. Upon a decrease in pressure, the spring 56 causes valve element 54 to recede to positively close off the valve structure from further fluid flow. In use, the structure is mounted to a boom 90, as shown in FIGS. 1 and 2. Boom 90 has a hollow interior 92 and one outlet port 94 which is internally threaded to receive the threaded end 24 of each valve mechanism. The boom 90 is mounted to appropriate struts 96 extending from the wing 98 of a crop dusting plane. Obviously, the valves 10 can be individually adjusted both by pivoting housing half 14 in the desired direction and by rotating nozzle tip 70 to direct the spray in a desired direction. The entire valve 10 is to be produced from a highly corrosive resistant material such as polypropylene or the like. Further, it will be noted that the external surface of each valve 10 is free from obstructions and joints to provide a smooth low-resistant flow path for air to reduce the drag on the aircraft.

FIGS. 7, 8 and 9 show a second embodiment of the pivot valve, this embodiment being generally labelled 110. Like valve 10, valve 110 is formed in two halves, labelled 112 and 114. Housing halves 112 and 114 have mating semi-spherical portions 116 and 130 which are rotatably mounted to each other by screw 140 and nut 141. An annular flange 118 formed on housing half 114 is received in annular groove 120 formed on housing half 112 for sealing the interior of the mated semi-spherical portions 116 and 130.

An annular chamber 160 is formed within the mated semi-spherical portions 116 and 130. Disposed within the annular chamber 160 is the positive shut-off mechanism for valve 110. The positive shut-off mechanism includes annular valve element 162 which has a V-shaped surface 164 on its front. Surface 164 engages valve seat 166 which is formed in semi-spherical portion 116. Valve element 162 is biased against seat 166 by a spring 170 which abuts one end of chamber 160 and the valve element 162 to block fluid flow through the valve when fluid pressure is insufficient to displace element 162 against the force of spring 170. A tubular sleeve 172 is formed integral with the semi-spherical portion 130 closely surrounding the threaded member and extending toward the fluid retaining chamber 160 and guiding the valve element 162.

By disposing the positive shut-off mechanism in the interior of chamber 160, it is possible to include additional features within the valve. For instance, threads 182 disposed internally of extension 180 can be used to mount a strainer and nut to hold the strainer (not shown), if desired. A nozzle tip 70 can also be included on the end of extension 180 by connection with external threads 190.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pivot valve for crop spraying equipment comprising:

housing means formed in two relatively movable parts and having an interior fluid retaining chamber;

fluid connection means in fluid communication with said interior chamber formed in said housing means and being operably connectible to a fluid supply means, so as to permit a supply of fluid to be directed from said fluid supply means into said chamber;

fluid discharge means operably connected to one of said two parts of said housing means and being in selective fluid communication with said chamber, said discharge means serving as a means whereby said fluid may be selectively discharged from said chamber;

valve control means positioned proximate to said chamber and serving to control a release of said fluid into said fluid discharge means in response to a selective pressurization of said fluid; and discharge direction control means for controlling a direction of discharge of said fluid from said fluid discharge means, said discharge direction control means including locking means opoerably joining said two parts of said housing means together, said locking means when in a released condition serving to permit relative movement between said two parts, whereby a selective angular orientation of said fluid discharge means can be achieved to thus control said direction of said fluid discharge, and when in a locked condition serving to prevent relative movement between said two parts to thus prevent any further change in said fluid direction, said locking means including a threaded member extending between said two parts and being operable, when tightened, to draw said two parts into a tight abutting relationship thereby to prevent said relative movement therebetween, one of said parts of the housing means including a tubular sleeve integral therewith and closely surrounding said threaded member and extending toward said fluid retaining chamber, said valve control means including a spring biased valve member having a centrally located aperture slidably received on and guided by the tubular sleeve, said valve member being positioned within an orifice in fluid communication with said fluid retaining chamber, said orifice being formed in the other of said two parts of said housing means, said valve member being retained in position within said orifice by said spring to facilitate fluid movement past the valve member only when a predetermined fluid pressure has been attained in the fluid chamber, said orifice receiving the threaded member extending between the two parts of the housing means, said valve member and spring being disposed on the tubular sleeve with the spring having one end engaging the housing means and the other end engaging the valve member for biasing the valve member axially of the tubular sleeve and threaded member, said orifice including a valve seat engaged by the valve member with the spring holding the valve member in closed relation to the valve seat until fluid pressure overcomes the spring, said valve seat and valve member being concentric with respect to the threaded member which also forms the pivotal connection between the two parts of the housing means.

2. In combination with a hollow spray boom supported from an aircraft and having a plurality of spray assemblies supported therefrom with each spray assembly including nozzle means for discharging flowable material therefrom, and means supporting the nozzle means to enable adjustment of the angular position, said supporting means forming a flow path from a pressurized source of flowable material to the nozzle means, said supporting means comprising a two-part housing with each part of the housing having an open hollow interior defined by a peripheral wall terminating in a circular edge, the circular edges on the peripheral walls being in contacting, sealing and rotatable relation, pivot means interconnecting said parts of the housing in concentric relation to the circular edges to retain the parts of the housing in assembled relation and enable rotational movement of the housing parts about an axis defined by the pivot means, a hollow extension on one part of said housing having a threaded connection with the boom for communication with a pressurized source of flowable material to supply flowable material to the hollow interior of said one part of the housing, said hollow boom and hollow extension forming part of the flow path, means on the other part of the housing communicating the hollow interior thereof with the nozzle means, and spring biased check valve means in the hollow interior of the housing parts to automatically close the flow path when pressure of the flowable material falls below a predetermined pressure and open the flow path when the pressure of the flowable material exceeds the predetermined pressure thereby providing a positive dripless cut off of the flow of the flowable material when the pressure thereof falls below said predetermined pressure, said pivot means being a pivot bolt extending through the hollow interior of said housing parts, said check valve means including a valve seat in the hollow interior of one of the housing parts in concentric relation to the pivot bolt, a tubular sleeve integral with the other of the housing parts and extending into the hollow interior of the hollow parts and in closely surrounding relation to said bolt, an annular valve member slidably mounted on said tubular sleeve for reciprocal movement toward and away from the valve seat, and a coil spring extending axially of the tubular sleeve in concentric spaced relation with the spring engaging the valve member and biasing it toward the valve seat, said valve seat being located upstream of the flow path and the valve member being located downstream thereof, said pivot bolt enabling angular adjustment of the two parts of the housing without affecting the function of the valve means.

* * * * *